United States Patent [19]

Tanaka et al.

[11] 4,395,746
[45] Jul. 26, 1983

[54] METHOD AND DEVICE FOR MAGNETICALLY TRANSPORTING

[75] Inventors: Hiroto Tanaka, Kamifukuoka; Yasumasa Kohno, Fujisawa; Hideyuki Tanaka; Kotaro Sasaki, both of Sendai, all of Japan

[73] Assignees: Ishikawajima-Harima Jukogyo Kabushiki Kaisha; Tohoku Kinzoku Kogyo Kabushiki Kaisha, both of Tokyo, Japan

[21] Appl. No.: 143,422

[22] Filed: Apr. 24, 1980

[30] Foreign Application Priority Data

| May 2, 1979 | [JP] | Japan | 54-54600 |
| May 4, 1979 | [JP] | Japan | 54-55040 |
| May 4, 1979 | [JP] | Japan | 54-55041 |

[51] Int. Cl.$^3$ .............................................. H01F 13/00
[52] U.S. Cl. ................................. 361/143; 134/1; 310/14
[58] Field of Search .............. 310/14; 134/1; 361/143; 239/706

[56] References Cited

U.S. PATENT DOCUMENTS

| 2,645,279 | 7/1953 | Rossmann | 310/14 UX |
| 3,695,934 | 10/1972 | Feldhaus | 134/1 |
| 3,841,264 | 10/1974 | Masuda | 239/706 X |
| 4,306,970 | 12/1981 | Tanaka et al. | 210/222 |

FOREIGN PATENT DOCUMENTS 638637  12/1978  U.S.S.R. ................................. 134/1

OTHER PUBLICATIONS

"Engineering Electromagnetics"–Hayt, Jr., McGraw-Hill Book Company ©1958, 1967.

*Primary Examiner*—Harry E. Moose, Jr.
*Attorney, Agent, or Firm*—B. B. Olive

[57] ABSTRACT

A method and device for magnetically transporting finely divided magnetic particles accumulated or deposited at a space. First a DC magnetic field is exerted to the finely divided magnetic particles so as to magnetize and bring them into an easy-to-be-handled state and then revolving alternating fields are exerted to the magnetized, finely divided magnetic particles, thereby magnetically transporting them.

4 Claims, 23 Drawing Figures

Fig. 19
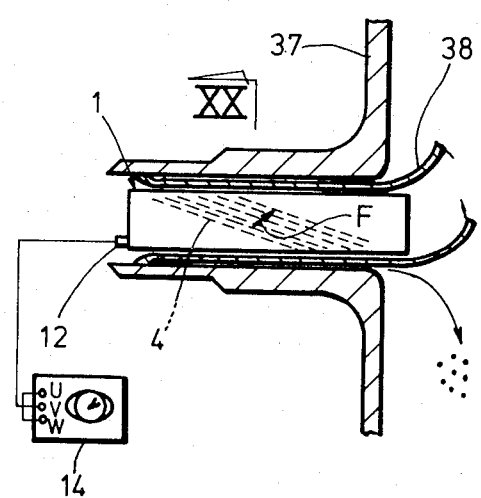
Fig. 20
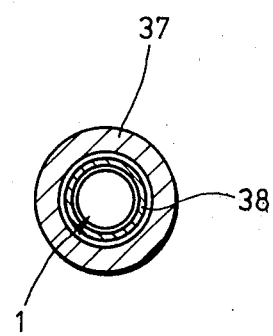
Fig. 21
(A)          (B)
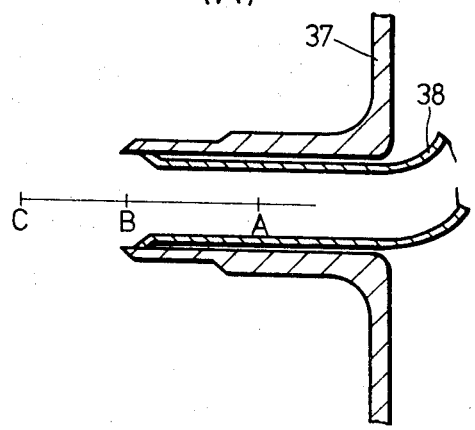 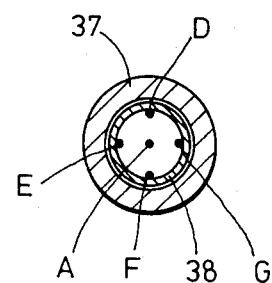

METHOD AND DEVICE FOR MAGNETICALLY TRANSPORTING

BACKGROUND OF THE INVENTION

The present invention relates to a method and device for magnetically moving and removing finely divided magnetic particles which are accumulated on or adhere to the walls of a pipe or the like in such a way that they will not be entrained by a fluid flowing through the pipe or the like.

For instance, CRUD (Canadian Reactor Unknown Deposite), which refers to finely divided particles of radioactive iron scales, is produced from the pipes, fuel rods and so on in a nuclear reactor and is deposited in pipes and tanks in primary and secondary cooling systems. CRUD consists of finely divided particles of ferromagnetic iron oxides such as magnetite ($Fe_3O_4$) and magnetic (gamma-$Fe_2O_3$) and of paramagnetic iron oxide such as hematite (alpha-$Fe_2O_3$). These particles are highly contaminated with radioactivity so that there is a fear that the operators who make periodic inspection, maintenance and repairs of the equipment at or near the places where such radioactive waste is accumulated are damaged or injured by radiation. CRUD tends to accumulate at such places in the pipes and tanks where the liquid flows slowly. For instance, as will be described below, CRUD accumulates in large quantities in the space between the safe-end nozzle and thermal sleeve. As a result, it is very dangerous to make access to these component parts for periodic inspection, maintenance and repairs and, consequently, a working time per day of one operator is determined by a tolerable biological dose rate and is very short in practice. It follows therefore that it takes many man-hours to complete the periodic inspection, maintenance and repairs of one reactor with the resultant increase not only in period but also in cost. More importantly, it should be avoided to let the operators to work at such hazardous places.

However, so far there have never been taken any positive and effective countermeasures against CRUD accumulation or deposition mainly because of the fact that CRUD is not susceptible to magnetism. The only countermeasure so far taken is to use the lead radiation shielding when the operators approaches the safe-end nozzles or the like as will be described below.

Referring to FIG. 1, in the case of the periodic inspection of a safe-end nozzle b extended from the wall of a pressure vessel a of a nuclear reactor, ring-shaped lead shielding bodies d are inserted into a thermal sleeve c and fitted over the safe-end nozzle b. Thereafter the opening of a biological shiled e is completely sealed with packs f filled with lead particles. Then the biological dose rate due to the pressure of CRUD in the space g between the safe-end nozzle b and the thermal sleeve c can be reduced.

In the case of the nuclear reactor plants, it is difficult to cut a pipe or the like at desired points and therefore the transport and removal of CRUD by the manipulation of a suitable gas or the like or a mechanical device from the exterior of the pressure vessel a is almost impossible. The above-described method for shielding with the formed lead shields d and the packs f of lead particles involves the following problems:

(1) The biological dose rate is too high for the operators.

(2) The formed lead shields d and the lead-particle-filled packs f are heavy so that their handling is dangerous and many handling steps are involved.

(3) A long time is required for shielding. As a result, it is impossible to employ this shielding arrangement when the periodic inspection, maintenance and reparis schedule is very tight.

(4) The cost for the periodic inspection, maintenance and repairs becomes high because of the cost for installing and removing the shields d and the packs f.

(5) The shields d in predetermined shape can be used so that they cannot be used in other places. In addition, after the periodic inspection, maintenance and repairs, these shields d and packs f must be stored for a next operation and therefore a storage space is required.

(6) Shielding is provided to reduce the biological dose rate as little as possible so that the formed lead shields d and the packs f filled with lead particles are considerably large in size, especially in thickness. As a result, the working space left is limited so that the periodic inspection, maintenance and repairs becomes difficult to accomplish.

In the nuclear power plants, in view of the safety problems of the component parts and because of the laws, orders, rules and the like regarding the safety of the operation of the nuclear reactor, it is next to impossible to cut a pipe or the like at desired points so that the jet of air or the like may be forced into the space.

In order to solve the problem of removing CRUD especially from the space g between the safe-end nozzle b and the thermal sleeve c, the inventors made extensive studies and experiments and found out that in the accumulation of CRUD the hematite particles, which are essentially non-magnetic, are surrounded by the magnetite and maghemite particles which are magnetic. Based upon this observed fact the inventors have proposed a novel method and device for magnetically moving and removing CRUD.

There have been proposed three types of magnetically removing CRUD as described below:

(1) A method in which, as in a linear motor, there is produced three-phase AC, flat moving fields.
(2) A method in which the alternating field produced by the alternative or DC electromagnet or permanent magnet is displaced mechanically.
(3) A method in which the DC field produced by the DC or permanent magnet is displaced mechanically. However, by any of the above three methods, the transportation facility of CRUD is 10% at the highest. In addition, a wide working space is needed.

In view of the above, the primary object of the present invention is to provide a method and device for magnetically transporting or removing magnetic particles especially CRUD with a higher degree of efficiency. The present invention will become apparent from the following description of one preferred embodiment thereof taken in conjunction with the accompanying drawings.

BRIEF EXPLANATION OF THE DRAWINGS

FIG. 17 showing CRUD particles prior to their magnetization while FIG. 18, the particles after their magnetization;

FIG. 19 is a view used for the explanation of how to remove CRUD particles;

FIG. 20 is an end view looking in the direction indicated by the arrow XX of FIG. 19;

FIG. 21(A) and FIG. 21(B) are views showing the points at which the radioactivity is measured after CRUD particles have been removed.

DETAILED DESCRIPTION OF THE PREFERRED EMBODIMENT

Fundamentally, the present invention is based on the conception that the finely divided magnetic particles such as CRUD particles accumulated in a pipe or the like are magnetized and then forced to displace themselves by the application of the three-phase revolving alternating fields.

Referring first to FIGS. 2 through 9, a three-phase revolving alternating field generator 1, which is exciter means in the present invention, will be described in detail. A cylindrical magnetic body or a magnetic cylinder 2 is provided with twelve slots 3 formed in the outer cylindrical surface and equally spaced apart from each other, the slots 3 being inclined at an angle with respect to the axis of the magnetic cylinder 2.

Figure 7:
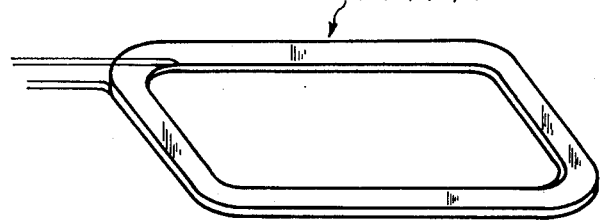
FIG. 7 is a perspective view of a coil thereof.

A molded coil 4 through 9 as shown in FIG. 7 is provided by winding the insulated conductors such as the conductors insulated with polyethylene in a form and thereafter further insulating with glass or cupton tapes. These coils 4 through 9 are placed in the slots 3.

The magnetic cylinder 2 with the coils 4 through 9 is then covered with a non-magnetic cover 10 and is encased in a housing 11 made of a non-magnetic material.

Figure 1:
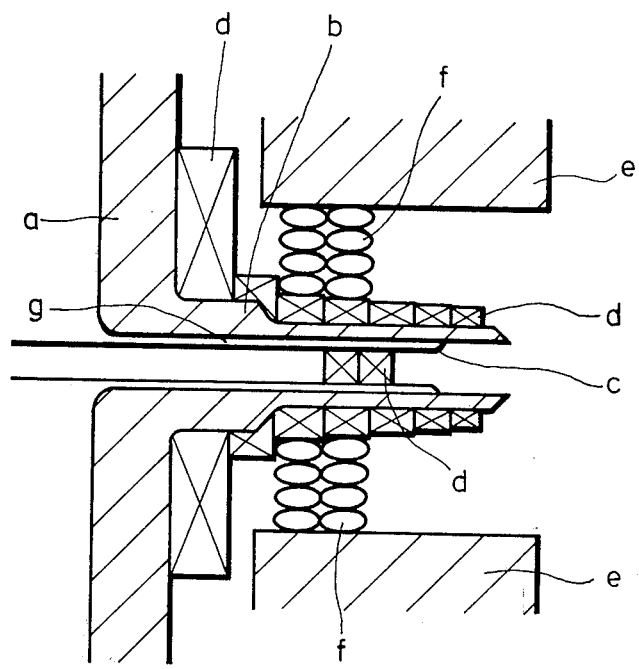
FIG. 1 is a view used for the explanation of the method for shielding the safe-end nozzle of a pressure vessel of a nuclear reactor.
Figure 2:
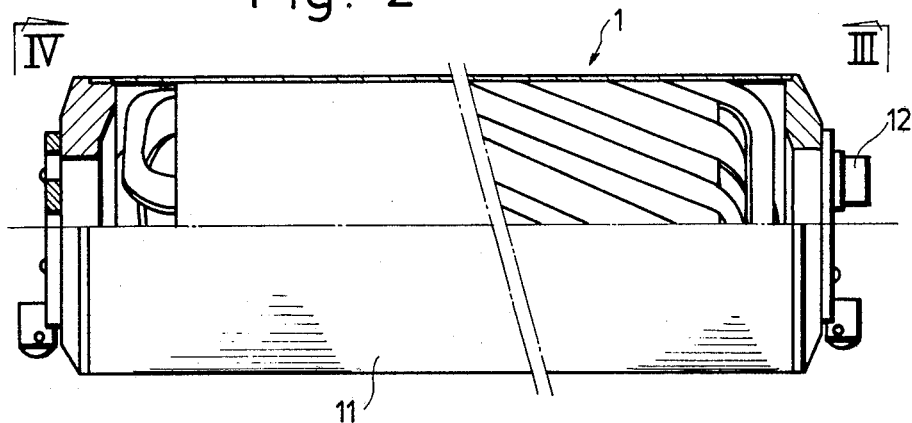
FIG. 2 is a side view, partly cut away, of a revolving alternating field generator used in the present invention.
Figure 3:
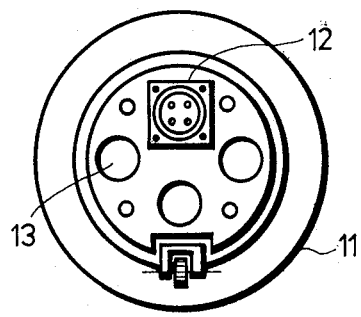
FIG. 3 is an end view thereof looking in the direction indicated by the arrow III of FIG. 2.
Figure 4:
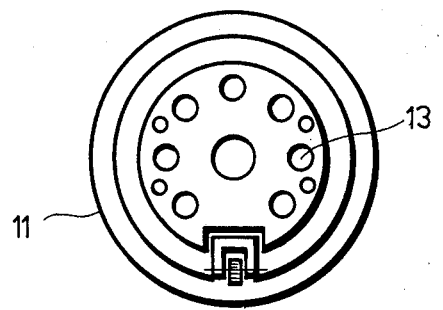
FIG. 4 is an end view thereof looking in the direction indicated by the arrow IV of FIG. 2.
Figure 5:
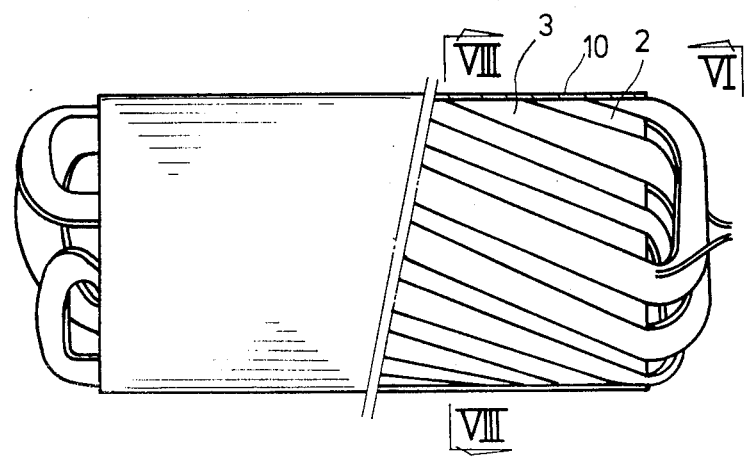
FIG. 5 is a view similar to FIG. 2 but illustrating the coil winding of the revolving field generator.
Figure 6:
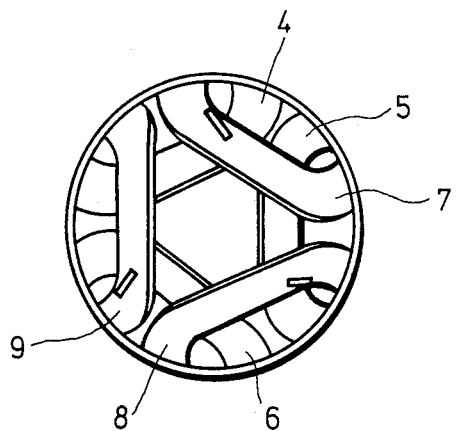
FIG. 6 is an end view thereof looking in the direction indicated by the arrow VI of FIG. 5.
Figure 8:
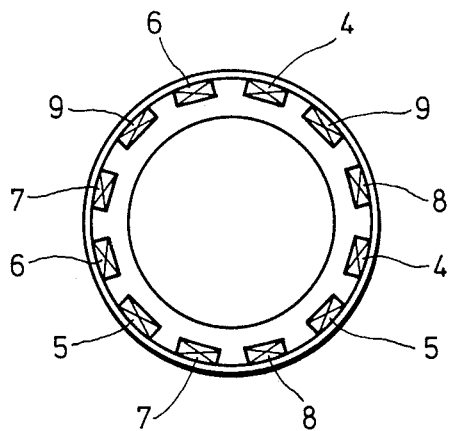
FIG. 8 is a sectional view taken along the line VIII—VIII of FIG. 5 showing the arrangement of coils or the winding.
Figure 9:
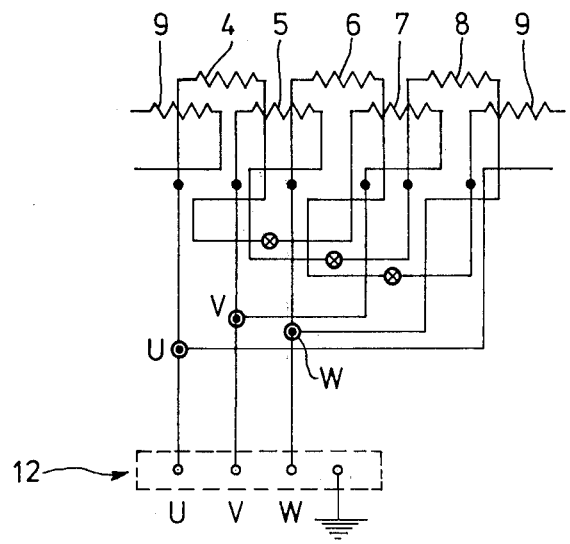
FIG. 9 is a circuit diagram illustrating the connection between the coils in the revolving alternating field generator shown in FIG. 2.

The coils 4 through 9 are arranged as shown in FIGS. 6 and 8. That is, each coil forms a three-quarter full-pitch winding. These coils 4 through 9 are interconnected with each other as shown in FIG. 9. That is, they are connected in the order of 4, 7, 5, 8, 6, 9 and 4, and the junction U between the coils 4 and 9, the junction V between the coils 5 and 7 and the junction W between the coils 6 and 8 are connected to a three-phase AC power source 14 (See FIG. 19) through a connector 12 (See FIG. 2 or 3). Thus when these coils 4 through 9 are excited, the finely divided magnetic particles such as CRUD particles are forced to move or revolve in the direction of the resultant F (See FIG. 19) of the vector of the revolving alternating fields produced by these coils 4 through 9 and the forces such as the gravity, the force due to viscosity and so on acting on CRUD particles as will be described in more detail below.

As the results of the experiments conducted by the inventors, it was found out that when the winding angle (i.e., the angle between the skewed slots 3 and the axis of the magnetic cylinder 2) of these coils 4 through 9 is about 30°, scraping and removing of CRUD particles can be accomplished in a very satisfactory manner. It was also found out that the smaller the winding angle, the higher the velocity at which CRUD particles are forced to move, but the scraping efficiency is low. As a result, the overall transportation efficiency is low. On the other hand, the greater the winding angle, the more efficient the scraping operation becomes, but the transportation velocity or speed becomes slow. Thus at the winding angle of about 30°, the scraping force and the transporting force are optimumly compromised.

Referring back to FIGS. 3 and 4, the end plates of the revolving alternating field generator 1 are provided with vent holes 13 through which the air flows into or out of the housing 11, whereby the generator 1 may be air-cooled.

Figure 10:
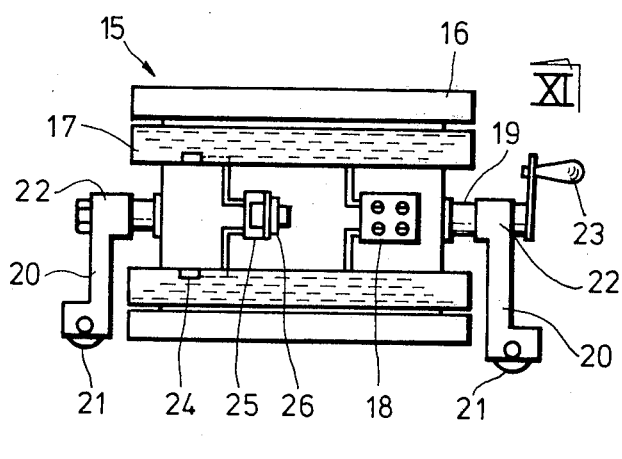
FIG. 10 is a side view of a DC exciter used in the present invention.
Figure 11:
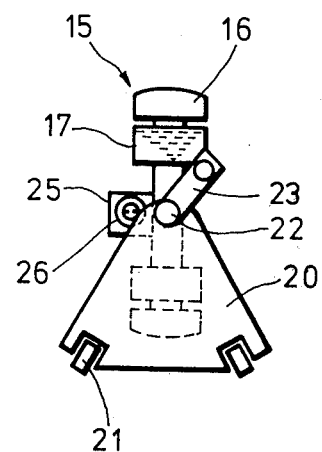
FIG. 11 is an end view thereof looking in the direction indicated by the arrow XI of FIG. 10.

Next referring to FIGS. 10 and 11, a DC a magnetic field generator or a DC electromagnet 15 will be described which is also used to magnetize CRUD particles accumulated in a pipe or the like so as to remove or transport them. The shafts 19 of a rotor or core 16, which has an I-shaped cross sectional configuration and carries coils 17, are rotatably supported by bearings 22 formed integral with triangular supporting frames 20 at the vertexes thereof. The frames 20 are provided with wheels 21. One shaft 19 is connected to a handle 23 so that the rotor 16 can be rotated manually. The coils 17 are connected through a connector 18 to a DC power source (not shown). A temperature sensor such as a thermocouple 24 is attached to the coil 17 and is connected to suitable means (not shown) through a plug 26 mounted on a mounting plate 25 which in turn is attached to the rotor 16, so that the temperature of the coils 17 can be externally measured.

Figure 12:
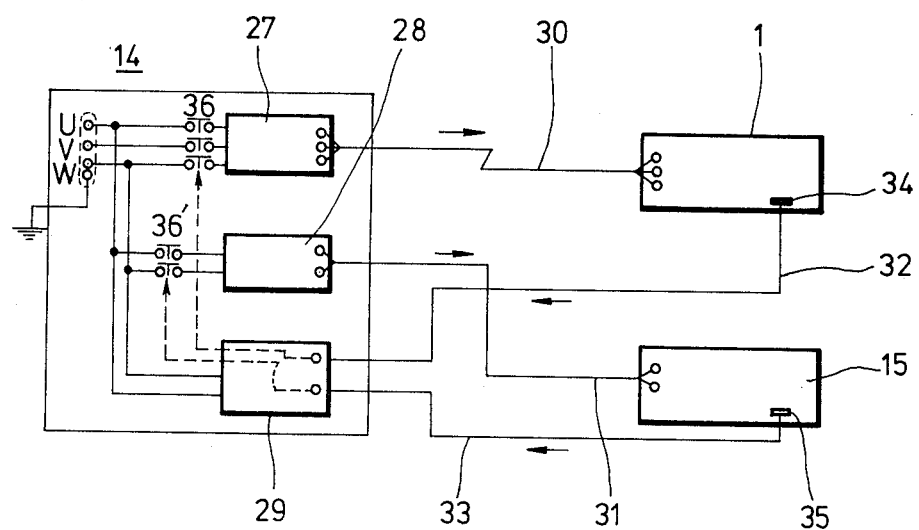
FIG. 12 is a circuit diagram of a power source used in the present invention.

In FIG. 12 is shown a circuit diagram of a power source used in the present invention. The revolving alternating field generator 1 is connected through a power cable 30 to a first control circuit 27 which regulates the voltage supplied to the generator 1 and controls a time period for energizing the generator or magnet 1. The DC field generator or magnet 15 is connected through a power cable 31 to a second control circuit 28 which regulates the voltage applied to the generator or magnet 15 and controls a time period for energizing the same. The power source further includes a third or sequence control circuit 29 which is connected through signal cables 32 and 33 to temperature sensors 34 and 35 in the AC and DC magnets 1 and 15 so that the sequence circuit 29 controls ON-OFF switches 36 and 36' to the first and second control circuits 27 and 28 in response to the signals from the temperature sensors 34 and 35.

Figure 13:
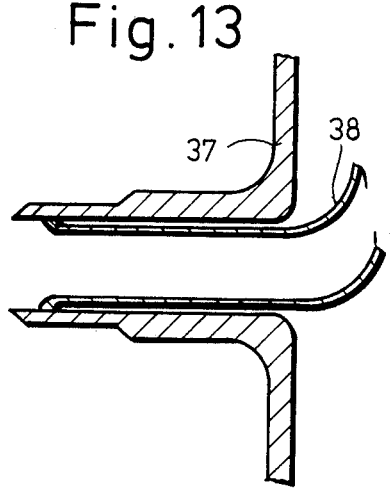
FIG. 13 is a view showing the accumulation of CRUD between a safe-end nozzle and a thermal sleeve of a nuclear reactor.
Figure 14:
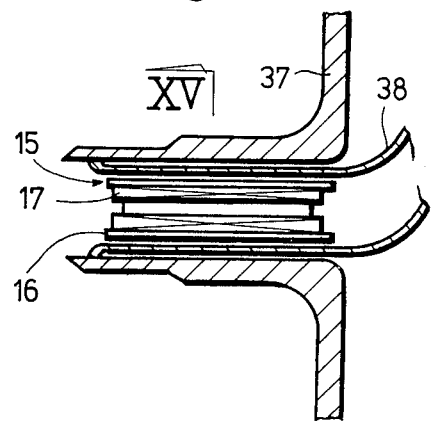
FIG. 14 is a view used for the explanation of how to magnetize CRUD accumulated as shown in FIG. 13.
Figure 15:
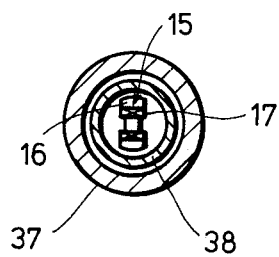
FIG. 15 is an end view looking in the direction indicated by the arrow XV of FIG. 14.
Figure 16:
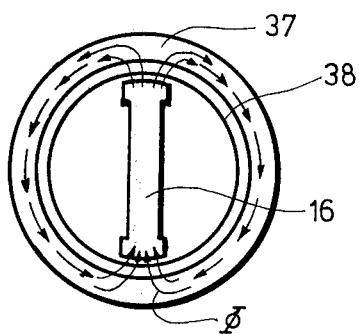
FIG. 16 is a view used for the explanation of the distribution of flux produced by the DC exciter shown in FIG. 15 in the safe-end nozzle.

Next the mode of operation of the device for magnetically transporting magnetic particles in accordance with the present invention will be described in conjunction with the removal of CRUD particles accumulated in the space between a safe-end nozzle 37 and a thermal sleeve 38 shown in FIG. 13. First the DC magnetic field generator or DC magnet 15 is inserted into the thermal sleeve 38 as shown in FIGS. 14 and 15 and is energized to exert the DC magnetic flux to CRUD particles as shown in FIG. 16. The rotor 16 and the safe-end nozzle 37, which is made of steel or the like, establishes a closed magnetic circuit. As a result, even with a low current the DC magnetic field generator or DC electromagnet 15 can magnetize CRUD particles to a satisfactory degree. Once the CRUD particles are magnetized, they become easy to be transported.

Figure 17:
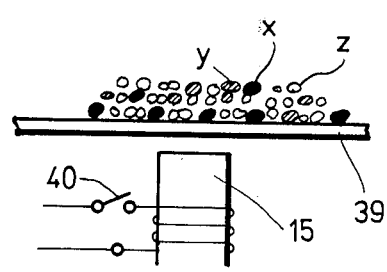
FIGS. 17 and 18 are views used for the experiments conducted by the inventors.
Figure 18:
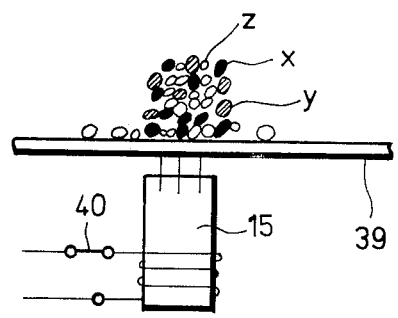

Next referring to FIGS. 17 and 18, how the finely divided magnetic particles are magnetized will be described. In the experiments conducted by the inventors, the mixture of finely divided particles consists of magnetite particles x, maghemite particles y and hematite particles z. Before the DC electromagnet 15 is energized, these particles are distributed as shown in FIG. 17, but when the DC electromagnet 15 is energized, the magnetite and maghemite particles x and y are attracted to the electromagnet 15 and embrace the hematite particles z between them as shown in FIG. 18 as if the particles embracing the hematite particle or particles z were one particle. As a result, these particles form a bridge as shown in FIG. 18 with the hematite particles z embraced by the magnetite and maghemite particles x and y. This bridge remains uncollapsed even after the DC electromagnet 15 is de-energized because of the residual magnetism on the magnetite and maghemite particles x and y. As a result, the particles x, y and z can be easily transported.

In practice CRUD particles are produced completely chemically. Therefore one particle contains magnetite, maghemite and hematite. This means that each particle contains magnetic substance. As a result, the bridge formation of coalescence of CRUD particles by the magnetic force is by far better for transportation than that of the particles x, y and z which are merely physically mixed.

Since the core 16 of the DC electromagnet 15 is rotatable as described above, CRUD particles in all the space between the safe-end nozzle 27 and the thermal sleeve 38 can be magnetized so that the transportation becomes very easy.

After the CRUD particles have been magnetized, the DC electromagnet 15 is removed out of the thermal sleeve 38 and instead the revolving alternating field generator 1 is inserted into the sleeve 38 as shown in FIGS. 19 and 20 and connected to the three-phase power source 14. When energized, the revolving alternating field generator 1 produces the revolving alternating fields so that CRUD particles are not only scraped but also forced to move in the direction of the resultant vector F as described in detail elsewhere. As a result, they are forced to move back into the pressure vessel as indicated by the arrow in FIG. 19.

The heat produced in the coils 4 through 9 is carried away by the air flowing through the generator 1 through the vent holes 13 so that they can be satisfactorily cooled as described elsewhere. Furthermore, since the angle of the skewed coils 4 through 9 is set to an optimum angle of about 30° as described elsewhere, an optimum combination of the scraping and moving forces can be obtained so that the CRUD particles can be moved at a high speed. In addition, the frequency of the power supplied to the generator 1 can be changed suitably so that as compared with the case in which the power of a predetermined frequency is applied, the CRUD particle transportation capability can be remarkably improved.

In summary, as described above according to the present invention the DC magnetic field is exerted to the accumulated CRUD particles by the DC magnetic field generator or electromagnet 15 so that they are aggregated into an easy-to-be-transported state, and then the revolving alternating fields are exerted so that they can be transported and removed at a higher degree of efficiency.

The inventors conducted the experiments in order to compare the transportation efficiencies between the particles which are magnetized and the particles which are not magnetized before the revolving alternating fields are exerted. The result was that the transportation efficiency of the magnetized particles is by far higher than that of non-magnetized particles as shown in Tables 1 and 2 below.

TABLE 1

| sample | current | | | | | | | |
|---|---|---|---|---|---|---|---|---|
| | 3A | 5A | 8A | 10A | 15A | 20A | 25A | 30A |
| not magnetized | 0 | 0 | 0 | 0 | 0 | 5~7% | 5~10% | about 10% |
| magnetized | 30% | 35% | 40% | 45% | 50% | 55% | 60% | 60% |

Note:
Each sample is a mixture consisting of 10% by weight of maghemite particles and 90% by weight of hematite particles.

TABLE 2

| sample | current | | | | | | | |
|---|---|---|---|---|---|---|---|---|
| | 3A | 5A | 8A | 10A | 15A | 20A | 25A | 30A |
| not magnetized | 0 | 0 | 0 | about 2% | about 5% | 10% | 15% | 15% |
| magnetized | 50% | 50% | 60% | 70% | 80% | 85% | 90% | 90% |

Note:
Each sample is a mixture consisting of 25% by weight of maghemite particles and 75% by weight of hematite particles.

In the experiments, 40 grams of the mixture consisting of maghemite and hematite particles was exerted to the revolving alternating magnetic fields. The transportation efficiency is given by $$\text{transportation efficiency} = \frac{\text{the weight of particles transported}}{\text{the initial weight (40 gr.)}} \times 100(\%)$$

For the magnetization, the DC electromagnet 15 was energized with the DC current of 200 V and 100 A for three seconds, and for magnetic transportation the revolving alternating field generator or AC electromagnet 1 was energized with the three-phase current of 50 Hz for five minutes.

From Tables 1 and 2 it is apparent that when the particles are magnetized before they are exerted to the revolving alternating fields, the transportation efficiency is remarkably improved even when the energizing current to the generator 1 is decreased.

As described elsewhere, CRUD particles are produced chemically and each particle contains magnetite, maghemite and hematite so that in practice a higher transportation efficiency can be attained.

In the experiments the inventors prepared also some samples consisting solely or collectively of iron oxides which are available in the market as pigments or materials for ferrite. These samples were accumulated in sleeves substantially similar in construction to the thermal sleeves used in the nuclear reactors. Some samples were magnetized while others were not magnetized. The three-phase revolving alternating field generator, which is 230 mm in diameter and one meter in length, was inserted into the sleeve to evaluate the transportation efficiency. The results are shown in Table 3 below. The generator was energized with the excitation current of 20 A and the magnetic induction at the surface of the pole was 250 G (gauses).

TABLE 3

| exper-iment Nos. | composition, % by weight | | mag-net-ized | energization current | | | |
|---|---|---|---|---|---|---|---|
| | $\gamma$-Fe$_2$O$_3$ | $\alpha$-Fe$_2$O$_3$ | | 10A | 20A | 30A | 40A |
| I | 100 | 0 | no | 10 | 70~80 | — | — |
| | | | yes | 20~30 | 90 | 100 | — |
| II | 0 | 100 | no | — | — | ≃5 | — |
| | | | yes | — | — | ≃10 | — |
| III | 30 | 70 | no | 20 | ≃50 | — | ≃70 |
| | | | yes | 20~30 | 60~70 | — | ≧90 |
| IV | 10 | 90 | no | 10 | 30~40 | — | ≃70 |
| | | | yes | 20~30 | 60~70 | — | ≧90 |
| V | 20 | 80 | no | 10~20 | ≃40 | — | ≃70 |
| | | | yes | 20~30 | 60~70 | — | ≧90 |

From Table 3 it is also seen that when the particles are magnetized prior to being exerted to the revolving alternating fields, the transportation efficiency can be considerably improved as compared with the case where the particles are not magnetized. This is true even when the excitation current to the generator 1 is decreased.

As described elsewhere, CRUD particles are produced chemically so that in practice the transportation efficiency is by far higher than that of the mixture consisting of particles having different physical and chemical properties.

Figure 22:
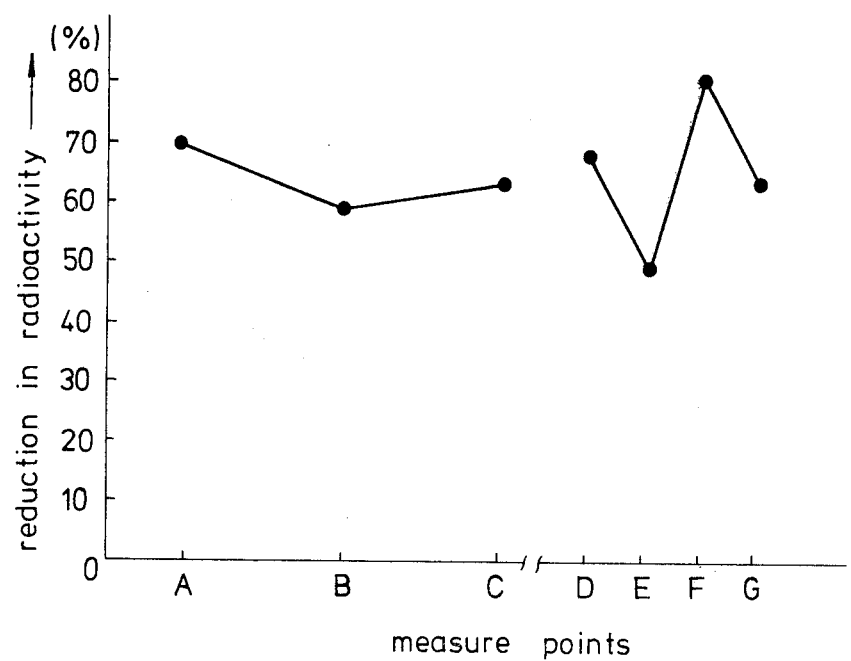
FIG. 22 is a graph showing the reduction in radioactivity at various points after the removal of CRUD particles.

The inventors conducted also the experiments for removing CRUD particles accumulated in the space between the safe-end nozzle and thermal sleeve in the nuclear reactor which is in operation. After removal or transportation of CRUD particles, the reduction in radioactivity was measured at the points A through G shown in FIGS. 21(A) and (B) and the results are shown in FIG. 22. It was confirmed that when the CRUD particles are magnetized prior to being exerted to the revolving alternating fields, the transportation efficiency is substantially between 60 and 80%, which is hitherto unattainable by any prior art methods and apparatus.

The inventors conducted also some experiments to compare the transportation efficiency between the revolving alternating field generator 1 with a ¾ full-pitch winding according to the present invention and the prior art revolving field generator or polyphase electromagnet with a 5/6 fractional winding and the results are shown in Table 4 below.

TABLE 4

| sam-ple Nos. | composition, % by weight | | transportation efficiency | | | |
|---|---|---|---|---|---|---|
| | | | the invention | | | prior art |
| | $\gamma$-Fe$_2$O$_3$ | $\alpha$-Fe$_2$O$_3$ | 10A | 20A | 30A | 20A |
| I | 100% | 0% | 20~30% | ≃80% | 100% | ≃5% |
| II | 0 | 100 | 0 | 0 | 5 | 0 |
| III | 30 | 70 | 20~30 | ≃60 | ≃85 | ≃3 |

The finely divided particles used in the experiments were commercially available iron oxides which are used as materials for pigment or ferrite. The samples consisted of one or more kinds of iron oxides. The revolving alternating field generator 1 was alternately energized with the three-phase current of 10 A, 20 A or 30 A or 30 seconds and de-energized for one minute. The prior art electromagnet was energized with the three-phase current of 20 A.

From Table 4 it is seen that the transportation efficiency of the revolving alternating generator 1 of the present invention is by far higher than that of the prior art polyphase electromagnet.

It is reported that CRUD particles consists of 20 to 30% by weight of magnetite, 40 to 60% by weight of hematite and 20 to 30% by weight of maghemite. The composition of the sample III corresponds to that of CRUD so that the method and device of the present invention are very effective in removing CRUD particles in practice.

From Table 4 it is seen that when the sample II consists only of hematite particles, which are non-magnetic, the transportation is impossible. However, when the maghemite particles, which are ferromagnetic, are mixed as in the sample II, the transportation efficiency can be considerably increased. The reason is that, as explained elsewhere, the hematite particles embraced by the maghemite particles are transported together with the latter which are susceptible to the revolving fields. As described many times elsewhere, CRUD particles are not the mixture of magnetite, hematite, and maghemite particles, but each particle contains magnetite, hematite and maghemite so that the transportation efficiency of CRUD particles becomes higher in practice.

Regardless of the fact that the revolving alternating field generator 1 is intermittenly or continuously energized, there exists only negligible difference in transportation efficiency. However, for instance, when the generator 1 is continuously energized with the current of 30 A, the surface temperature rises to 80° C. after 35 minutes, but when it is intermittenly energized, the surface temperature is maintained below 60° even after one hour operation. As a result, the intermittent energization is preferable in view of the reliable and dependable operation.

So far the core 2 has been described as consisting of a cylindrical body, but a solid cylinder may be used and the effects are almost same.

So far the present invention has been described in conjunction with the removal of CRUD particles accumulated in the space between the safe-end nozzle and the thermal sleeve, but it is to be understood that the present invention may be equally applied to the removal of other magnetic particles. The DC and polyphase electromagnets 15 and 1 have been described as being inserted into the thermal sleeve; that is, into a pipe or the like, but it is to be understood that in order to remove the magnetic particles deposited in a pipe or the like, the DC and polyphase electromagnets 15 and 1 may be of the split type so that they may be fitted around the pipe or the like. In addition, instead of the DC electromagnet 15, a permanent magnet may be used.

The novel effects, features and advantages of the present invention may be summarized as follows:

(i) First the magnetic particles accumulated or deposited in a pipe or the like are so magnetized that they are brought into an easy-to-be-handled state and then are exerted to the revolving alternating fields so that they are transported to a desired destination. As a result, the high transportation efficiency may be ensured.

(ii) Even when the magnetic particles have been long accumulated or deposited, they are readily brought into an easy-to-be-handled or loose state by the magnetization so that they can be easily transported when exerted to the revolving alternating fields.

(iii) The outer diameters of both the magnetic field generators 1 and 15 may be predetermined so as to be inserted into a pipe or the like with a predetermined inner diameter as described above in conjunction with the thermal sleeve. As a result, the generators 1 and 15 can be made light in weight and easy to operate. In addition, no special working space is needed. Furthermore the magnetic particles can be transported or removed by the magnetic forces without direct exertion of other forces. As a result, the method and apparatus of the present invention are adapted to be used in a limited space especially in the nuclear reactors.

(iv) With the method and device of the present invention, CRUD particles accumulated in a nuclear reactor can be effectively removed as described above so that the biological dose rate can be reduced. As a result, the operators may be well safeguarded against radiation and the permissible or tolerable working hour per day can be increased.

(v) The power source incorporates the third or sequence control circuit which, in response to the signals from the temperature sensors 34 and 35, turns on and off the ON-OFF switches 36 and 36' of the power supplies to the generators 1 and 15, respectively, so that their coils are prevented from overheating. Thus, the device of the present invention becomes highly reliable in operation.

(vi) As described above, the highly efficient removal of CRUD particles can be effected and consequently the operators are safeguarded against injuries by radiation. As a result, the tolerable working hours can be increased. Therefore both the construction cost and period of a nuclear power plant or the like can be decreased.

What is claimed is:

1. Apparatus for transporting fine particles of which at least a part of magnetizable such as the CRUD particles accumulated in a nuclear reactor, comprising:
    (a) first magnetic field source means for applying a stationary magnetic field to magnetize the particles prior to transport; and
    (b) second magnetic field source means comprising a multi-phase generator with a plurality of ring-shapedly formed coils disposed on a cylindrical magnetic core and having a three-quarter full-pitch winding and operative on the particles magnetized by the first magnetic field source means for applying a revolving magnetic field to transport the magnetized particles.

2. Apparatus according to claim 1 characterized in that the planes of the coils of the multi-phase generator are inclined by an angle of 30° relative to the axis of the cylindrical core.

3. Apparatus for transporting fine particles of which at least a part of magnetizable such as the CRUD particles accumulated in a nuclear reactor, comprising:
    (a) a first magnetic field source means comprising a direct current generator having a coil secured to a core rotatable above its axis for applying a stationary magnetic field to magnetize the particles prior to transport; and
    (b) second magnetic field source means operative on the particles magnetized by the first magnetic field source means for applying a revolving magnetic field to transport the magnetized particles.

4. Apparatus according to claim 3 wherein the direct current operator core is rectilinear in axial direction and has an I-shaped cross section.

* * * * *